Jan. 5, 1932.  J. E. RUST  1,839,504
REEL
Filed July 15, 1927   2 Sheets-Sheet 1
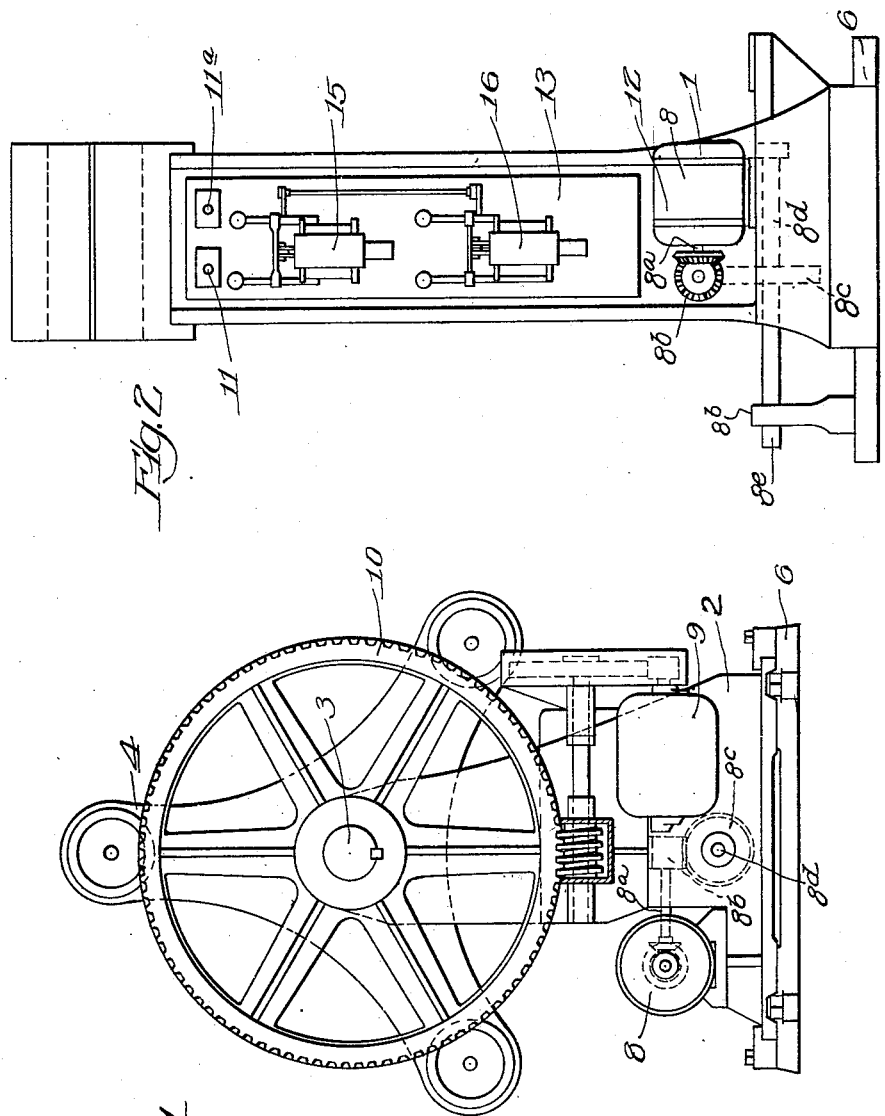

Jan. 5, 1932.    J. E. RUST    1,839,504
REEL
Filed July 15, 1927    2 Sheets-Sheet 2
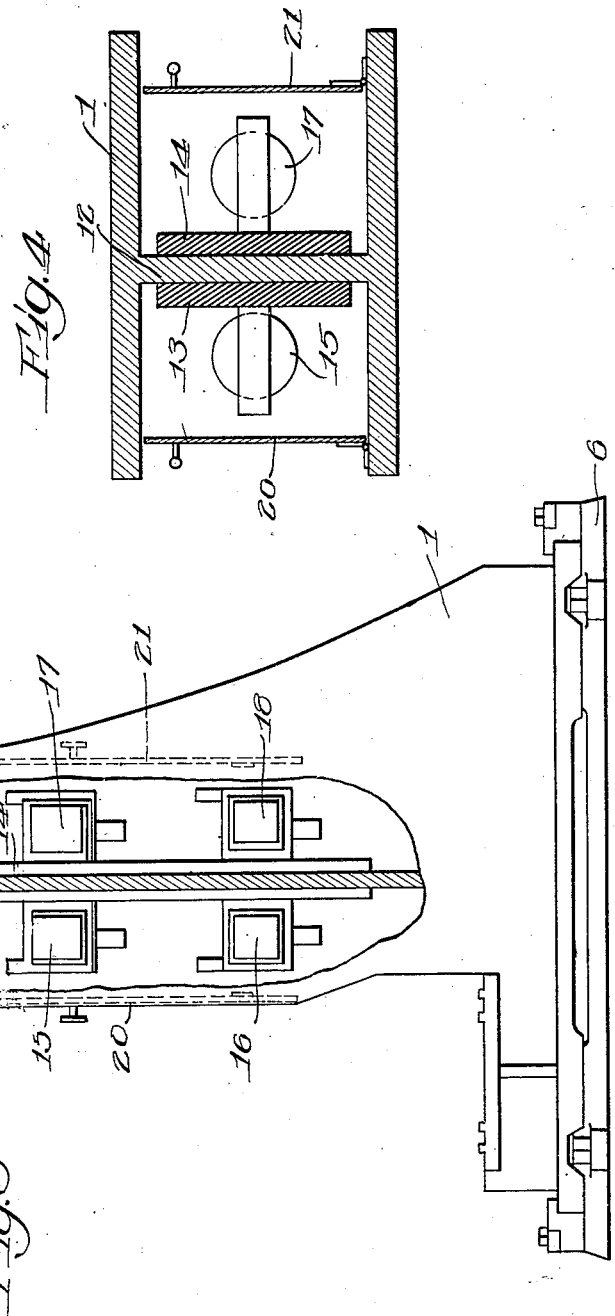
Inventor:
James E. Rust
By Parker & Carter Attys Patented Jan. 5, 1932

1,839,504

UNITED STATES PATENT OFFICE

JAMES E. RUST, OF PARK RIDGE, ILLINOIS, ASSIGNOR TO GUSTAVUS A. E. KOHLER, OF CHICAGO, ILLINOIS

REEL

Application filed July 15, 1927. Serial No. 205,886.

This invention relates to reels particularly adapted to be used in delivering paper to printing presses, and has for its object to provide a new and improved reel of this description.

The invention has as a further object to provide a reel with a controller panel in one of the supports.

The invention has as a further object to provide a reel which shall be simple to erect and by means of which the possibility of error is reduced and the construction made more compact and the parts more accessible.

The invention has other objects which are more particularly pointed out in the accompanying description.

Referring now to the drawings:

Fig. 1 is a view of one form of reel embodying the invention.

Fig. 2 is an enlarged end view of one of the supports, with parts omitted.

Fig. 3 is a side view of the support shown in Fig. 2, with parts removed to show the interior construction.

Fig. 4 is a sectional view taken on line 4—4 of Fig. 3.

Like numerals refer to like parts throughout the several figures.

Referring now to the drawings:

I have shown a reel used for delivering paper to printing presses. This reel comprises two supports 1 and 2 on which is mounted a shaft 3. This shaft is provided with the spiders 4 and 5 between which the rolls of paper are mounted. The supports 1 and 2 are slidably mounted upon bases 6 and 7 and are moved along said bases by the motor 8. This motor 8 drives a shaft 8a which in turn drives a worm 8b which drives a worm wheel 8c on a shaft 8d. The end 8e of this shaft is screw threaded and works in a nut 8f mounted on the base 6. It will be seen that when the motor is operated in one direction the threaded end 8e rotating in the stationary nut 8f will cause the support 1 to move in one direction, and when the motor is operated in the other direction it will cause the support 1 to move in the opposite direction. The shaft 3 is rotated by means of the motor 9 which is operatively connected with a worm gear 10. The reel, by means of these motors is controlled by a system of push buttons 11, 11a, etc., mounted on the support 1.

This support is hollow and is provided with an interior vertical wall 12. Mounted upon this wall are the panels 13 and 14. Mounted upon these panels are the controlling devices for the motors which may be of any suitable form and are here shown as clapper switches 15, 16, 17, and 18. Doors 20 and 21 are provided so as to enclose the panels and associated parts. It is only necessary to open these doors to secure access to the panels and the switches mounted thereon.

The push buttons control the circuits through these switches and, thereby, through the motors so that the motors can be started and stopped by pressing the push buttons, the reel, thereby easily controlled.

This construction greatly simplifies the wiring and the erection of the device as the principal wiring can be done at the shop when the reel is being constructed. The panels are also enclosed in the supports and, thereby, protected. The connections to the motor are, therefore, shortened and time is saved and the possibility of error reduced.

I claim:

1. A reel comprising supports, bases upon which said supports are movably mounted, a motor for moving the supports with relation to the bases, a shaft mounted on said supports, a motor for operating said shaft, one of said supports being hollow, a wall on the interior of said hollow support, the controlling switches for said motors supported by said wall, and push buttons on said support for controlling said switches.

2. A reel comprising supports, bases upon which said supports are movably mounted, a motor for moving the supports with relation to the bases, a shaft mounted on said supports, a motor for operating said shaft, one of said supports being hollow, a vertical wall on the interior of said hollow support, panels on opposite sides of said vertical wall, a controlling device for said motors mounted on said panels and push buttons for said motors on the exterior of said support.

3. A reel for supplying paper to printing presses comprising supports, bases upon which said supports are mounted, a shaft mounted on said supports, arms connected with said shafts and between which the rolls of paper are supported, a motor for operating said shaft, one of said supports consisting of two separated parallel members with a space between them and a vertical connecting wall connecting them together near their middle, a controlling device for said motor supported on said vertical connecting wall and located in the space between the parallel members so as to be protected thereby.

Signed at Chicago, county of Cook, and State of Illinois, this 27th day of June, 1927.

JAMES E. RUST.